(12) United States Patent
Obergfaell et al.

(10) Patent No.: US 10,378,435 B2
(45) Date of Patent: Aug. 13, 2019

(54) WATER INJECTION DEVICE OF AN INTERNAL COMBUSTION ENGINE, AND METHOD FOR OPERATING A WATER INJECTION DEVICE OF SAID TYPE

(71) Applicant: Robert Bosch GmbH, Stuttgart (DE)

(72) Inventors: Simon Obergfaell, Waiblingen (DE); Ingmar Burak, Stuttgart (DE); Peter Schenk, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/572,033

(22) PCT Filed: Apr. 18, 2016

(86) PCT No.: PCT/EP2016/058509
§ 371 (c)(1),
(2) Date: Nov. 6, 2017

(87) PCT Pub. No.: WO2016/177558
PCT Pub. Date: Nov. 10, 2016

(65) Prior Publication Data
US 2018/0106189 A1     Apr. 19, 2018

(30) Foreign Application Priority Data

May 7, 2015   (DE) .......................... 10 2015 208 489

(51) Int. Cl.
*F02B 47/02*     (2006.01)
*F02M 25/022*   (2006.01)
(Continued)

(52) U.S. Cl.
CPC .......... *F02B 47/02* (2013.01); *F02D 41/0025* (2013.01); *F02D 41/22* (2013.01);
(Continued)

(58) Field of Classification Search
CPC ....... F02D 41/0025; F02D 41/22; F02B 47/02
See application file for complete search history.

(56) References Cited

U.S. PATENT DOCUMENTS

| 6,311,651 | B1 * | 11/2001 | Singh ...................... F02B 47/02 |
| | | | 123/25 C |
| 6,463,890 | B1 * | 10/2002 | Chomiak ................ F02B 47/02 |
| | | | 123/25 P |
| 2005/0034456 | A1 * | 2/2005 | Hedman .................. F01B 17/04 |
| | | | 60/712 |

FOREIGN PATENT DOCUMENTS

DE             195 39 885 A1    11/1996
DE       10 2013 208 950 A1    12/2014
(Continued)

OTHER PUBLICATIONS

International Search Report corresponding to PCT Application No. PCT/EP2016/058509, dated Jul. 13, 2016 (German and English language document) (5 pages).

*Primary Examiner* — Kevin A Lathers
(74) *Attorney, Agent, or Firm* — Maginot, Moore & Beck LLP

(57) ABSTRACT

A water injection device of an internal combustion engine is provided. The water injection device includes a water tank for storing water, and a delivery element for delivering the water. The delivery element is connected to the water tank. The water injection device further includes at least one water injector for injecting water. The at least one water injector is connected to the delivery element. The water injection device further includes a pressure sensor, which is arranged in a line region between the delivery element and the water injector, and a control unit, which is designed to determine, on the basis of pressure data of the pressure sensor, a (Continued)

formation of vapor in the aforementioned line region when the water injector is closed and the delivery element is deactivated.

12 Claims, 2 Drawing Sheets

(51) Int. Cl.
*F02D 41/22* (2006.01)
*F02D 41/00* (2006.01)
(52) U.S. Cl.
CPC ..... *F02M 25/0227* (2013.01); *F02D 2250/02* (2013.01); *Y02T 10/40* (2013.01)

(56) References Cited

FOREIGN PATENT DOCUMENTS

| | | | |
|---|---|---|---|
| GB | 2 146 387 | A | 4/1985 |
| JP | 60-73036 | A | 4/1985 |
| JP | 9-49458 | A | 2/1997 |
| JP | 2007-518931 | A | 7/2007 |
| JP | 2012-225214 | A | 11/2012 |
| WO | 2005/071249 | A1 | 8/2005 |
| WO | 2014/080266 | A1 | 5/2014 |

* cited by examiner

WATER INJECTION DEVICE OF AN INTERNAL COMBUSTION ENGINE, AND METHOD FOR OPERATING A WATER INJECTION DEVICE OF SAID TYPE

This application is a 35 U.S.C. § 371 National Stage Application of PCT/EP2016/058509, filed on Apr. 18, 2016, which claims the benefit of priority to Serial No. DE 10 2015 208 489.2, filed on May 7, 2015 in Germany, the disclosures of which are incorporated herein by reference in their entireties.

BACKGROUND

The present disclosure relates to a water injection device of an internal combustion engine as well as such an internal combustion engine. A further aspect of the disclosure relates to a method for operating such a water injection device.

As a result of increasing demands in terms of reduced carbon dioxide emissions, internal combustion engines are increasingly being optimized in terms of fuel consumption. However, known internal combustion engines cannot be operated optimally in terms of consumption at operating points with high load since operation is restricted by knocking and high exhaust gas temperatures. One possible measure to reduce knocking and lower the exhaust gas temperatures is the injection of water. In this case, separate water injection systems are normally present in order to enable the injection of water. A water injection system for an internal combustion engine with exhaust gas recirculation is known e.g. from WO 2014/080266 A1 in the case of which the water is injected into the mass flow of the exhaust gas recirculation.

The pump used to convey water is switched off between the operating points at which the water injection system is activated. This means that the water is located in the injectors and the lines of the water injection system. As a result of the high temperatures of the parts of the internal combustion engine in the vicinity of the water injection system, the stationary water can heat up and possibly evaporate. This effect is amplified in the case of journeys at a great height where the air pressure is lower. As a result of the formation of steam, functional impairments can arise when restarting the water injection system since the system pressure can only be built up with a delay as a result of the steam. The water injection system is thus ready for operation with a delay. As a result of this delayed readiness for operation, temperature peaks in the exhaust gas and knocking events in combustion can occur in the case of rapid jumps in load.

SUMMARY

The water injection device according to the disclosure has the advantage over this that an incipient formation of steam is detected in a simple and direct manner. This is achieved according to the disclosure by a water injection device of an internal combustion engine, which comprises a water tank for storing water, a conveying element for conveying the water, wherein the conveying element is connected to the water tank, at least one water injector for injecting water which is connected to the conveying element, a pressure sensor which is arranged in a line region between the conveying element and the water injector, and a control unit. According to the disclosure, the control unit is configured, based on pressure data of the pressure sensor, to determine a formation of steam in the above-mentioned line region in the case of a closed water injector and switched off conveying element. Since a formation of steam is determined by the control unit according to the disclosure, measures can also be quickly initiated in order to avoid a further development of steam and/or reduce the steam which has already been generated. Short pressure build-up times and rapid injection release are thus ensured without additional components, such as e.g. a shut-off element, being required. This leads to a low-cost and compact structure and to simple control of the water injection device.

The following description provides preferred further developments of the disclosure.

The control unit is preferably configured to compare a first pressure value with a second pressure value, wherein the first pressure value is recorded at a first point in time and the second pressure valve is recorded at a second point in time, and to determine a formation of steam in the line region between the conveying element and the water injector if a difference between the first pressure value and the second pressure value is greater than a first setpoint value, wherein the first setpoint value is determined in the case of a steam-free water injection device. Since the determined pressure difference is greater than the expected pressure difference, this indicates that there is steam in the line region.

In particular, a formation of steam is identified if a difference between the first pressure value and the second pressure value is greater than $0.1 \times 10^5$ Pa, particularly preferably greater than $0.2 \times 10^5$ Pa. In such a case, a reliable statement can be made about a significant formation of steam in the line region.

Alternatively, a formation of steam is identified if the second pressure value is greater than a second setpoint valve. The second setpoint value is defined as the pressure below which the water injection device is regarded as steam-free.

Moreover, the pressure sensor is configured to record the second pressure value with a time interval of at least 10 seconds, in particular 100 seconds, from the first pressure value from the second pressure value. Reliable identification of the formation of steam is thus enabled even if pressure fluctuations occur in the water injection device within a short period of time.

According to a particularly preferred configuration of the disclosure, the conveying element is formed as a displacement pump. As a result of the use of a conveying element which operates according to the displacement principle, an almost sealed off system is formed. This enables even more rapid identification of a formation of steam in the line region between the conveying element and the water injector.

If a formation of steam is identified in the water injection device, the control unit is advantageously configured to actuate the conveying element and the water injector in order to remove steam located in the line region between the conveying element and the water injector. The conveying element can thus more rapidly build up pressure for the injection of water.

As a result, the water injection device is ready for operation as quickly as possible if an injection of water is demanded by the internal combustion engine.

Alternatively or additionally, the control unit is configured to actuate the conveying element and the water injector in order to inject water if a formation of steam is determined. As a result of the injection of water, which injection is in particular not relevant to combustion, the temperature of the components of the internal combustion engine, such as e.g. a distributor in the case of a plurality of water injectors, is reduced. This can bring about an at least partial condensation of the steam. One or more water injections can take place for this purpose.

According to one advantageous configuration of the disclosure, a plurality of water injectors are provided which are connected to a distributor which is arranged between the water injectors and the pressure sensor.

A further aspect of the present disclosure relates to an internal combustion engine which comprises a water injection device according to the disclosure. The advantages obtained in relation to the device according to the disclosure are also obtained here.

The internal combustion engine is particularly preferably operated according to the Otto principle and with petrol. The internal combustion engine is to be understood as an internal combustion engine which is operated according to the Otto principle and in the case of which combustion of petrol or a petrol/air mixture is carried out by positive ignition in the form of a spark plug. Since, in the case of such an internal combustion engine, the point in time of ignition by positive ignition is precisely predetermined and combustion is improved via the water injection, the advantages described with reference to the water injection device according to the disclosure can be fully exploited. As a result of the rapid identification of a formation of steam, the above-mentioned measures can be taken in order to ensure short pressure build-up times and as rapid as possible injection release. Knocking can thus also be avoided in the case of rapid jumps in load.

The present disclosure furthermore relates to a method for operating a water injection device of an internal combustion engine which comprises a conveying element for conveying water, at least one water injector for injection of water which is connected to the conveying element, and a pressure sensor which is arranged in a line region between the conveying element and the water injector, wherein, based on pressure data of the pressure sensor, formation of steam in the above-mentioned line region in the case of a closed water injector and switched off conveying element is determined.

A first pressure value is preferably recorded at a first point in time and a second pressure valve is recorded at a second point in time. A formation of steam is determined in the line region between the conveying element and the water injector if a difference between the first pressure value and the second pressure value is greater than a first setpoint value.

Alternatively, a formation of steam in the line region is determined if the second pressure value is greater than a second setpoint value.

BRIEF DESCRIPTION OF THE DRAWINGS

A preferred exemplary embodiment of the disclosure is described in detail below with reference to the enclosed drawing. In the drawing.

DETAILED DESCRIPTION

A water injection device 1 of an internal combustion engine 2 according to one preferred exemplary embodiment of the present disclosure is described in detail below with reference to FIGS. 1 to 3. In particular, internal combustion engine 2 is operated according to the Otto principle and with direct petrol injection.

Figure 1:
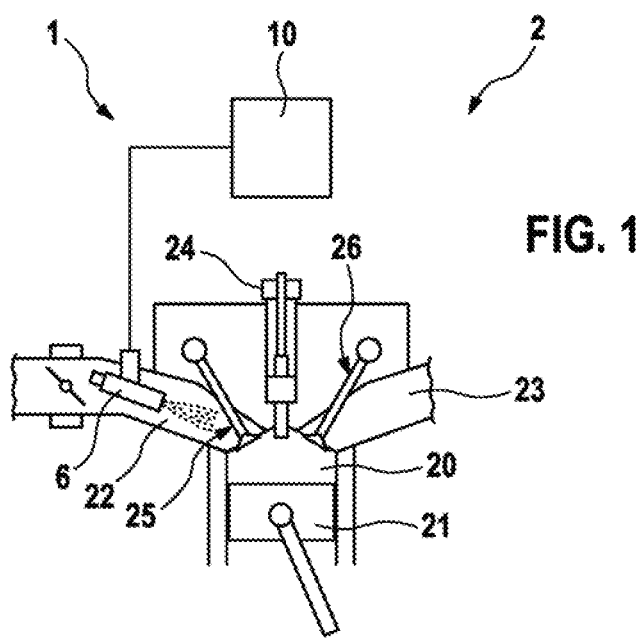
FIG. 1 is a highly simplified schematic view of an internal combustion engine with a water injection device according to the preferred exemplary embodiment of the present disclosure.

Internal combustion engine 2 is represented schematically in FIG. 1, internal combustion engine 2 having a plurality of cylinders as well as a part of water injection device 1 according to the disclosure. Internal combustion engine 2 comprises for each cylinder a combustion chamber 20 in which a piston 21 can be moved to and fro. Internal combustion engine 2 further preferably has for each cylinder two inlet valves 25 with in each case one inlet duct 22, via which two inlet valves 25 air is supplied to combustion chamber 20. Exhaust gas is discharged via exhaust gas duct 23. To this end, an outlet valve 26 is arranged on exhaust gas duct 23. Reference number 24 furthermore designates a fuel injection valve.

A water injector 6 is furthermore arranged on each inlet duct 22, which water injector 6 injects water into inlet duct 22 of internal combustion engine 2 via a control unit 10. In this exemplary embodiment, two water injectors 6 are provided for each cylinder, which leads to improved processing or to an increase in the maximum quantity of water which can be injected for each combustion cycle. Alternatively, one water injector can be arranged for each cylinder.

Figure 2:
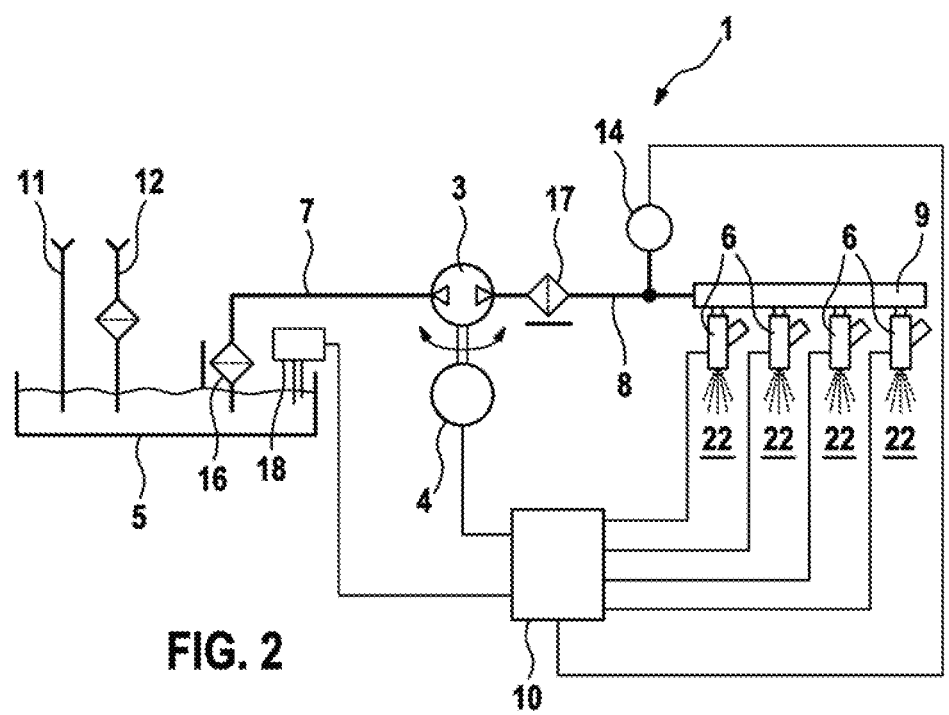
FIG. 2 shows a simplified schematic view of the water injection device according to the preferred exemplary embodiment.

The water injection device according to the disclosure is shown in detail in FIG. 2. Water injection device 1 comprises a conveying element 3, which is in the form of a pump, and an electrical drive 4 for driving the pump. The pump is in particular a displacement pump.

A water tank 5 is furthermore provided which is connected by a first line 7 to conveying element 3. A second line 8 (line region) connects conveying element 3 to a distributor 9 or a rail to which a plurality of water injectors 6 are connected. Second line 8 with distributor 9 corresponds to the line region between conveying element 3 and water injectors 6.

For injection of water into inlet ducts 22 of internal combustion engine 2, water is conveyed out of water tank 5 through conveying element 3 into water injectors 6. A condensate of an evaporator, not shown, of an air-conditioning system is preferably used, to which end device 1 according to the disclosure has a supply line 11 for injection of water.

Alternatively or additionally to the condensate, deionized water can be conveyed via a refilling line 12 into water tank 5. A sieve can optionally be provided in refilling line 12. A preliminary filter 16 is furthermore arranged in first line 7 and a fine filter 17 is arranged in second line 8. Preliminary filter 16 and fine filter 17 are optionally heatable. Moreover, a water fill level and/or temperature sensor 18 is provided for the water located in water tank 5, which sensor 18 can be controlled via control unit 10.

In order to determine whether a formation of steam is present in water injection device 1 if water injectors 6 are closed and conveying element 3 is switched off, a pressure sensor 14 is provided in second line 8. Pressure sensor 14 is actuated via control unit 10. A case in which water injectors 6 are closed and conveying element 3 is switched off, which corresponds to an inactive water injection, can occur e.g. during a stopping phase of the stop/start system. During this phase, no water injection is demanded since the internal combustion engine is switched off. The water located in second line 8 and distributor 9 can heat up and lead to a formation of steam.

Figure 3:
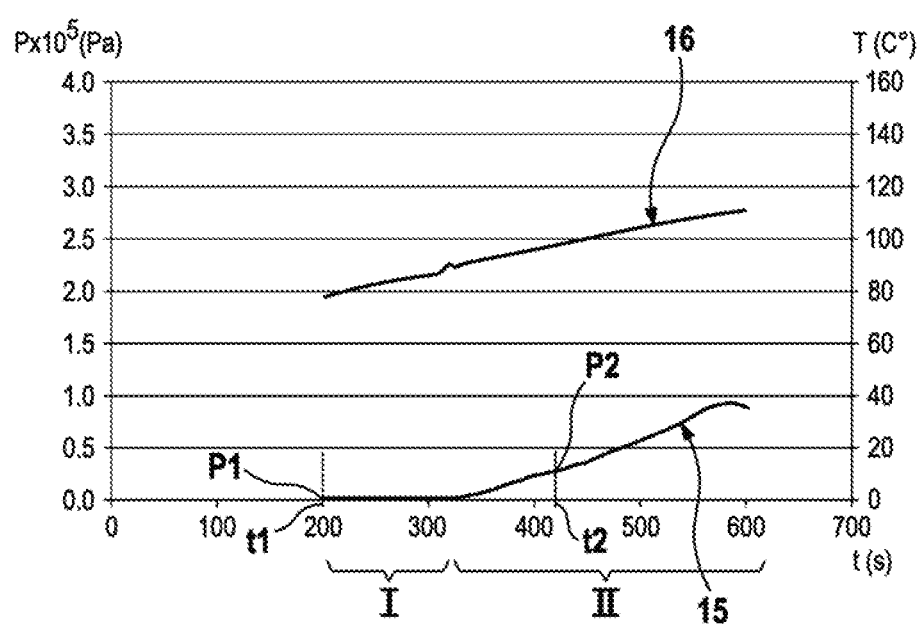
FIG. 3 shows a diagram in which a chronological profile of the temperature and a corresponding profile of the pressure in a line region of the device according to the disclosure are represented.

This is described on the basis of FIG. 3 which shows a diagram in which a chronological profile of a recorded system pressure P in second line 8 on distributor 9 and a chronological profile of temperature T of distributor 9 according to the preferred exemplary embodiment are represented.

The chronological profile of recorded system pressure P is provided with reference number 15 and the chronological profile of temperature T is provided with reference number 16. Profile 15 of system pressure P is divided into a first diagram region I and a second diagram region II. The x-axis designates time t in s and the y-axis designates the temperature in ° C. and recorded pressure P×$10^5$ in Pa. A temperature sensor, not shown in FIG. 2, can be provided to record the temperature at distributor 9.

As is apparent from FIG. 3, the pressure in first diagram region I remains significantly unchanged. First diagram region I corresponds to the phase during which the water located in line region 8 between conveying element 3 and water injectors 6 is heated, e.g. by the still hot internal combustion engine. This corresponds to the rise in the temperature of distributor 9 in first diagram region I.

From a certain point in time, the boiling temperature of the water is reached, as a result of which steam is generated. A pressure drop is generated via conveying element 3 since the steam expands in this direction and the pressure in line region 8 increases significantly. This corresponds to second diagram region II in FIG. 3.

In order to identify such a formation of steam in second line 8 and distributor 9, the pressure data recorded by pressure sensor 14 are processed and/or compared with one another by control unit 10.

In particular, a first pressure value P1 is recorded at a first point in time t1 and a second pressure value P2 is recorded at a second point in time t2 via pressure sensor 14, which second point in time t2 lies after first point in time t1.

Control unit 10 is configured to compare first pressure value P1 with second pressure value P2. It is determined in particular by control unit 10 whether a difference between first pressure value P1 and second pressure value P2 is greater than a first setpoint value. The first setpoint value is defined as the pressure difference below which it is identified that no formation of steam is present.

Alternatively, second pressure value P2 can be compared with a second setpoint value. The second setpoint value corresponds to the pressure below which it is identified that no formation of steam has arisen. This means that no steam is present if second pressure value P2 lower than the second setpoint value.

It is also possible in the context of the disclosure to record a larger number of pressure values. The pressure can thus be recorded not only at points in time t1 and t2.

If an increase in pressure is identified after an expired period of time (in this case after point in time t2) in which the pressure remains unchanged, it is ascertained that a formation of steam has taken place in second line 8 and distributor 9.

As soon as it is identified by control unit 10 on the basis of the recorded pressure values of pressure sensor 14 that steam exists in line region 8, conveying element 3 and water injectors 6 are operated so that the resultant steam is removed from water injection device 1. Moreover, one or more water injections can be carried out, as a result of which at least part of the steam is condensed. Distributor 9 is also cooled by the injected water, which leads to avoidance of a further development of steam.

Once the required system pressure has built up, combustion-related water injection can be carried out.

Water injection device 1 according to the disclosure has the advantage of a rapid communication of its operational readiness and the release of the injection in the case of the required system pressure. A delayed build up of pressure in the case of the formation of steam can furthermore be rapidly identified. To this end, additional components such as e.g. shut-off elements in the line region between conveying element 3 and water injectors 6 can be omitted, which leads to a lower cost and compact structure of water injection device 1 according to the disclosure.

The invention claimed is:

1. A water injection device of an internal combustion engine, comprising:
    a water tank configured to store water;
    a conveying element configured to convey the water, the conveying element connected to the water tank;
    at least one water injector configured to inject water, the at least one water injector connected to the conveying element;
    a pressure sensor arranged in a line region between the conveying element and the at least one water injector; and
    a control unit configured, based on pressure data of the pressure sensor, to determine a formation of steam in the line region when the at least one water injector is closed and the conveying element is switched off.

2. The water injection device as claimed in claim 1, wherein:
    the control unit is configured to compare a first pressure value, which is recorded at a first point in time, with a second pressure value, which is recorded at a second point in time, and determine a formation of steam in the line region between the conveying element and the water injector if the difference between the first pressure value and the second pressure value is greater than a first setpoint value, and
    the first setpoint value is determined in a case of a steam-free water injection device.

3. The water injection device as claimed in claim 2, wherein the pressure sensor is configured to record the second pressure value with a time interval of at least 10 seconds from the first pressure value.

4. The water injection device as claimed in claim 3, wherein the time interval is 100 seconds from the first pressure value.

5. The water injection device as claimed in claim 1, wherein the conveying element is a displacement pump.

6. The water injection device as claimed in claim 1, wherein the control unit is configured to actuate the conveying element and the at least one water injector to remove steam located in the line region between the conveying element and the water injector if a formation of steam is determined.

7. The water injection device as claimed in claim 1, wherein the control unit is configured to actuate the conveying element and the at least one water injector to inject water if a formation of steam is determined.

8. The water injection device as claimed in claim 1, wherein:
    the at least one water injector includes a plurality of water injectors connected to a distributor, and
    the distributor is arranged between the water injectors and the pressure sensor.

9. An internal combustion engine, comprising:
    a water injection device, including:
        a water tank configured to store water;

a conveying element configured to convey the water, the conveying element connected to the water tank;

at least one water injector configured to inject water, the at least one water injector connected to the conveying element;

a pressure sensor arranged in a line region between the conveying element and the at least one water injector; and a control unit configured, based on pressure data of the pressure sensor, to determine a formation of steam in the line region when the at least one water injector is closed and the conveying element is switched off.

10. The internal combustion engine as claimed in claim 9, wherein the internal combustion engine is configured to be operated with petrol and is configured to be operated according to the Otto principle.

11. A method for operating a water injection device of an internal combustion engine, including:

determining, based on pressure data of a pressure sensor, formation of steam in a line region in a case of a closed water injector and a switched off conveying element, wherein:

the conveying element is configured to convey the water, the water injector is configured to inject water, the water injector is connected to the conveying element, and the pressure sensor is arranged in the line region between the conveying element and the water injector.

12. The method as claimed in claim 11, wherein:

a first pressure value is recorded at a first point in time and a second pressure valve is recorded at a second point in time, the formation of steam is determined in the line region between the conveying element and the water injector if a difference between the first pressure value and the second pressure value is greater than a first setpoint value, and the first setpoint value is determined in a steam-free water injection device.

* * * * *